(12) United States Patent
Schmidt

(10) Patent No.: US 8,862,314 B2
(45) Date of Patent: Oct. 14, 2014

(54) METHOD AND SYSTEM FOR TRANSMITTING CONTROL DATA BETWEEN A VEHICLE DATA RECORDING DEVICE AND A TEST DEVICE

(75) Inventor: Gunnar Schmidt, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 628 days.

(21) Appl. No.: 13/267,433

(22) Filed: Oct. 6, 2011

(65) Prior Publication Data
US 2013/0028339 A1 Jan. 31, 2013

(30) Foreign Application Priority Data

Jul. 29, 2011 (DE) .......................... 10 2011 108 775

(51) Int. Cl.
*G01M 17/00* (2006.01)
*G06F 7/00* (2006.01)
*G06F 19/00* (2011.01)

(52) U.S. Cl.
USPC .......... 701/31.5; 713/168; 713/169; 455/410; 380/44

(58) Field of Classification Search
USPC .......................... 701/31.5; 375/259; 726/3, 5; 713/168–171; 455/410; 380/44
See application file for complete search history.

(56) References Cited

U.S. PATENT DOCUMENTS

| 4,205,383 | A | * | 5/1980 | Bakanovich et al. | 703/3 |
| 5,596,317 | A | * | 1/1997 | Brinkmeyer et al. | 340/5.26 |
| 5,822,226 | A | * | 10/1998 | Watkins et al. | 703/28 |
| 6,885,317 | B1 | * | 4/2005 | Gutowitz | 341/22 |
| 7,457,413 | B2 | * | 11/2008 | Thuvesholmen et al. | 380/46 |
| 7,646,300 | B2 | * | 1/2010 | Stewart et al. | 340/572.1 |
| 8,090,005 | B2 | * | 1/2012 | Barnes et al. | 375/146 |
| 8,725,123 | B2 | * | 5/2014 | Raleigh et al. | 455/414.1 |
| 2005/0129242 | A1 | | 6/2005 | Glickman | |
| 2006/0190730 | A1 | | 8/2006 | Iwamura | |
| 2007/0174467 | A1 | * | 7/2007 | Ballou et al. | 709/227 |
| 2008/0318547 | A1 | * | 12/2008 | Ballou et al. | 455/410 |
| 2009/0119759 | A1 | | 5/2009 | Taugbol | |

(Continued)

FOREIGN PATENT DOCUMENTS

| DE | 102011108775 A1 | * | 1/2013 |
| EP | 1 850 255 A1 | | 10/2007 |
| EP | 2551828 A1 | * | 1/2013 |

OTHER PUBLICATIONS

A Novel Adaptive Sub-Carrier Interleaving Application to Millimeter-Wave WPAN OFDM Systems (IST MAGNET Project); Siaud, I. et al.; Portable Information Devices, 2007. PORTABLE07. IEEE International Conf.on; DOI: 10.1109/PORTABLE.2007.40 Publication Year: 2007 , pp. 1-5.*

(Continued)

*Primary Examiner* — Cuong H Nguyen
(74) *Attorney, Agent, or Firm* — Cozen O'Connor

(57) ABSTRACT

A method and system for transmitting control data between a vehicle data recorder arranged in a motor vehicle and a test device arranged outside the motor vehicle. A random code is generated by the vehicle data recorder or by the test device as a connection code. The random code is detected and input device not generating the random code. After the random code has been input into the device coupling is effected automatically via a short-distance radio link between the devices. Subsequently the control data is transmitted by the vehicle data recorder to the test device via the short-distance radio link. After the control data transmission has ended, the short-distance radio link between the vehicle data recorder and the test device is separated and the random code is deleted in the vehicle data recorder and in the test device.

11 Claims, 3 Drawing Sheets

(56) References Cited

U.S. PATENT DOCUMENTS

2009/0196329 A1* 8/2009 Legate et al. ................. 375/141
2011/0191129 A1* 8/2011 Moriya ........................ 705/7.11
2013/0028339 A1* 1/2013 Schmidt ........................ 375/259

OTHER PUBLICATIONS

In-situ experimental investigations of electron space-charge instabilities and noise mechanisms in a reentrant crossed-field amplifier via distributed-cathode emission and gated-beam injection; Ye, J.Z. et al.; Plasma Science, 1995. IEEE Conf. Record-Abstracts., 1995 IEEE Inter. Conf. on DOI: 10.1109/PLASMA.1995.529665; Pub Year: 1995.*

Implementation of system-level fault diagnostics in vehicles on a generic test platform; Bo Wang ; Amor-Segan, M. ; Jones, R.P. Computer Science and Automation Engineering (CSAE), 2011 IEEE Inter Conf on; vol. 4 ; DOI: 10.1109/CSAE.2011.5952850 Publication Year: 2011 , pp. 277-281.*

Wireless communicating implant for record of vital diagnosis parameters; Charbel, A. et al.: Microelectronics Packaging Conference (EMPC) , 2013 European; Publication Year: 2013 , pp. 1-6.*

* cited by examiner

METHOD AND SYSTEM FOR TRANSMITTING CONTROL DATA BETWEEN A VEHICLE DATA RECORDING DEVICE AND A TEST DEVICE

BACKGROUND OF THE INVENTION

1. Field of the Invention

The invention relates to a method for transmitting control data between a vehicle data recording device arranged in a motor vehicle and a test device arranged outside the motor vehicle. In addition, the invention relates to a system for performing the aforementioned method using a vehicle data recording device arranged in a motor vehicle and a test device arranged outside the motor vehicle.

2. Description of the Related Art

An aforementioned vehicle data recording device is known, for example, as a tachograph in a truck. In the tachograph, vehicle and driver data are stored, which can be read out and evaluated by regulatory authorities for control purposes by a test device. For this purpose, the data to be controlled, called control data in a text which follows, is transmitted from the tachograph to a mobile data medium, for example a data card with a memory chip or a so-called memory stick, particularly a USB stick, which is detachably connected to the tachograph. When the control data has been transferred to the mobile data medium, the latter is separated from the tachograph, taken out of the truck and connected to the test device. The test device thereupon reads the control data out of the mobile data medium and evaluates them.

SUMMARY OF THE INVENTION

It is the object of the invention to specify a method of the type initially mentioned, which can be carried out in a simple manner and offers high reliability in the data transmission. In addition, the invention is based on the object of creating a system by which such a method can be carried out.

The object mentioned first is achieved, according to one embodiment of the invention, by a method in that a random code is generated by the vehicle data recording device or by the test device as a connection code comprising a connection identification identifier, in that the random code is indicated by the device generating the random code, in that the random code indicated is detected and input into the device not generating the random code, in that after the random code has been input into the device not generating the random code, coupling is effected automatically via a short-distance radio link between the device not generating the random code and the device generating the random code, in that subsequently the control data is transmitted by the vehicle data recording device to the test device via the short-distance radio link, in that after the control data transmission has ended, the short-distance radio link between the vehicle data recording device and the test device is separated and in that subsequently the random code is deleted in the vehicle data recording device and in the test device.

The utilization of the random code as connection identification identifier is of particular advantage in the invention. This provides a particularly high protection against manipulation which, at the same time, provides for a rapid and uncomplicated check of the vehicle and driver data of the vehicle data recording device by a test person from a regulatory authority. In this context, the test person can perform the check advantageously on site in the immediate vicinity of the motor vehicle without the motor vehicle having to be entered by the test person. Using the invention, an elaborate cable link, which is imaginable in principle, between vehicle data recording device and test device is not necessary. Nevertheless, a direct link between vehicle data recording device and test device is advantageously established and used by the method according to the invention due to the short-distance technology used for the short-distance radio link. An elaborate security structure which goes beyond the devices vehicle data recording device and test device involved directly in the method is advantageously not required by the invention. In the invention, the random code is used as joint secret of vehicle data recording device and test device; on the basis of the random code, the two devices mentioned can authenticate themselves and further, cryptographic keys can be generated, for example, on this basis in order to produce an encrypted control data transmission. The random code is conveyed to the other device in each case, that is to say the device not generating the random code, not via the radio link but, for example, by acoustic transmission or, for example, by optical transmission.

The vehicle data recording device can be, for example, a tachograph, but also any other vehicle-connected data recording device which records driver and/or vehicle data. The connection identification identifier can simply be a connection identification number. The short-distance radio link according to the invention is preferably a Bluetooth connection.

According to an advantageous development of the invention, a device identification identifier is permanently allocated to the vehicle data recording device and the device identification identifier is transmitted by radio to the test device for setting up the short-distance radio link before the random code is generated. This ensures that the short-distance radio link is set up precisely between the two intended devices. The device identification identifier can be preferably a device identification number. The device identification identifier can also have a component which identifies the motor vehicle in which the vehicle data recording device is arranged. In the case of a number of vehicle data recording devices present in the vicinity of the test device, the device intended for checking can be selected specifically on the basis of its device identification identifier.

The protection against manipulation can be additionally increased if, in accordance with an advantageous development of the method according to the invention, after the short-distance radio link is separated, the device identification identifier is deleted in the test device.

According to another advantageous development of the invention, the random code has two code components, one of the code components comprising a device identifier of the device generating the random code and the other code component comprising the connection identification identifier. In this manner, the protection against manipulation of the method is increased even further. The code component comprising the device identifier can advantageously replace the transmission of the device identification identifier permanently allocated to the vehicle data recording device.

In another advantageous development according to the invention, the random code is indicated optically and/or acoustically by the device generating the random code. This provides in a simple manner for an easily detectable indication of the random code.

It is of particular advantage if, according to a development of the invention, the optical indication of the random code is effected by a printout of the random code by a printer. Transmission errors on the way to the input of the random code into the device not generating the random code can be almost eliminated. The printout can be, for example, in plain text;

however, it is also conceivable that the printout takes the form of a barcode which is read by a barcode reader of the device not generating the random code, as a result of which a reliable and simple input of the random code into the device not generating the random code is effected.

In a reliable and simple manner, the random code can be input manually and/or acoustically into the device not generating the random code, according to another advantageous development of the invention.

The method offers a further increased, particularly high manipulation protection if, according to another advantageous development of the invention, in the case of a non-error-free control data transmission a new random code is first generated, before another control data transmission. It is of particular advantage in this context that a new control data transmission always requires generation of a new random code even, for example, in the case of a repetition due to previously aborted or faulty transmissions.

The object mentioned secondly above is achieved, according to the invention, by a system, in that the vehicle data recording device and/or the test device has a random generator for generating a random code as a connection code, comprising a connection identification identifier, for a short-distance radio link between the vehicle data recording device and the test device, in that the device generating the random code, out of the devices vehicle data recording device and test device, has an output device for the random code and in that the device not generating the random code has an input device for the random code.

In the system according to the invention, the provision of a random generator in at least one of the two devices, vehicle data recording device and test device, and the output device for the random code in the device generating the random code and the input device for the random code in the other device, is of particular advantage, as a result of which a simple system structure supporting high protection against manipulation is achieved.

It is of particular advantage for a simple system structure if, according to an advantageous development of the invention, it is provided that the output device has an optical display device, for example a screen, and/or a loudspeaker and/or a printer.

According to another advantageous development of the invention, the input device has a keyboard which can be advantageously constructed, for example, as a touch-sensitive screen, and/or a microphone. The input device could also advantageously have an optical reading device, for example a barcode reader for reading a barcode printed out.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are shown in the drawing and will be described in greater detail in the text which follows. In the drawings.

Respectively corresponding elements are provided with identical reference symbols in all figures.

DETAILED DESCRIPTION OF THE PRESENTLY PREFERRED EMBODIMENTS

Figure 1:
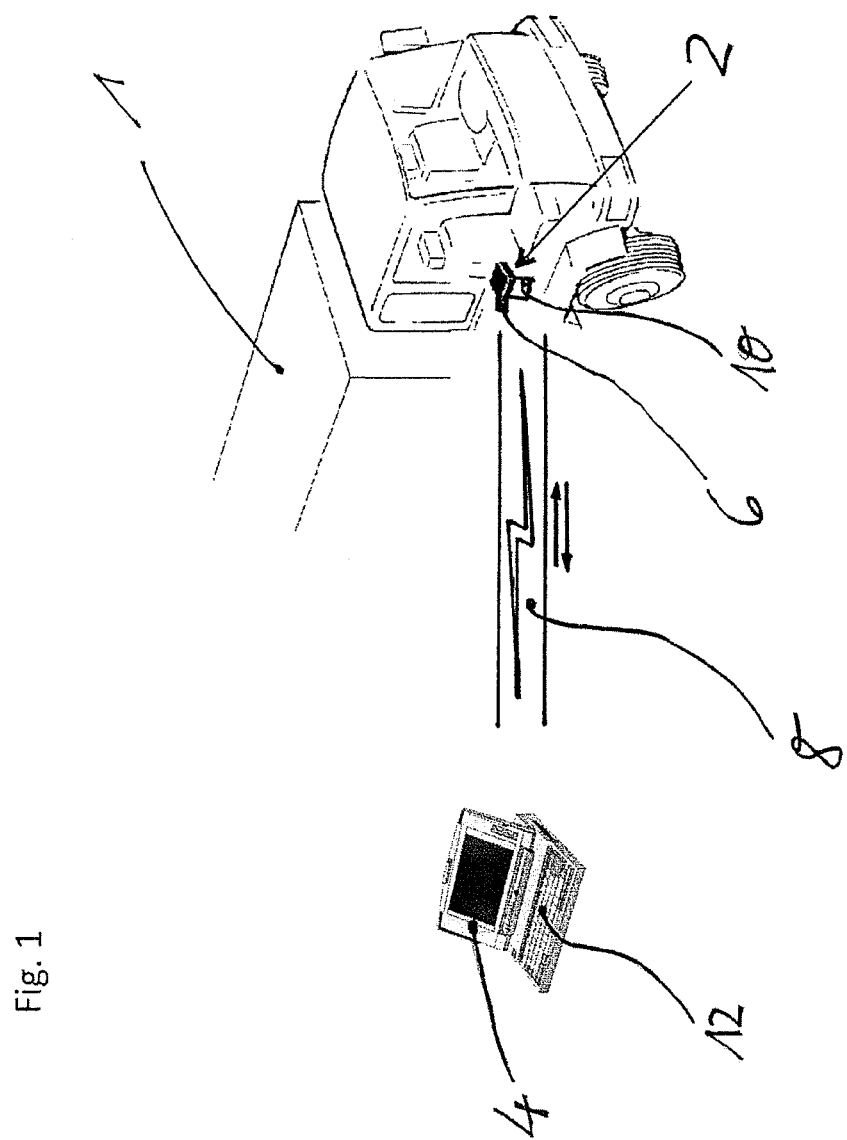
FIG. 1 is a system with a vehicle data recording device and a test device.

FIG. 1 shows a system comprising a vehicle data recording device 2 arranged in a motor vehicle 1, and a test device 4 arranged outside the motor vehicle 1. In this exemplary embodiment, the vehicle data recording device 2 has a random generator 6 for generating a random code as a connection code, comprising a connection identification identifier, for a short-distance radio link 8, preferably a Bluetooth link, between the vehicle data recording device 2 and the test device 4. The short-distance radio link 8 is a bidirectional link.

The vehicle data recording device 2, which generates the random code, has an output device 10 for the random code. The output device 10 can have an optical display device, preferably a screen, for optically indicating the random code or a loudspeaker for acoustically indicating the random code or a printer for the printout, that is to say of a special form of an optical indication, of the random code, combinations also being possible.

The test device 4, which does not generate the random code, has an input device 12 for the random code. The input device 12 can have a keyboard which, for example, can also be designed as a touch-sensitive screen, for the manual input, or a microphone for the acoustic input, of the random code, a combination of microphone and keyboard also being possible.

Figure 2:
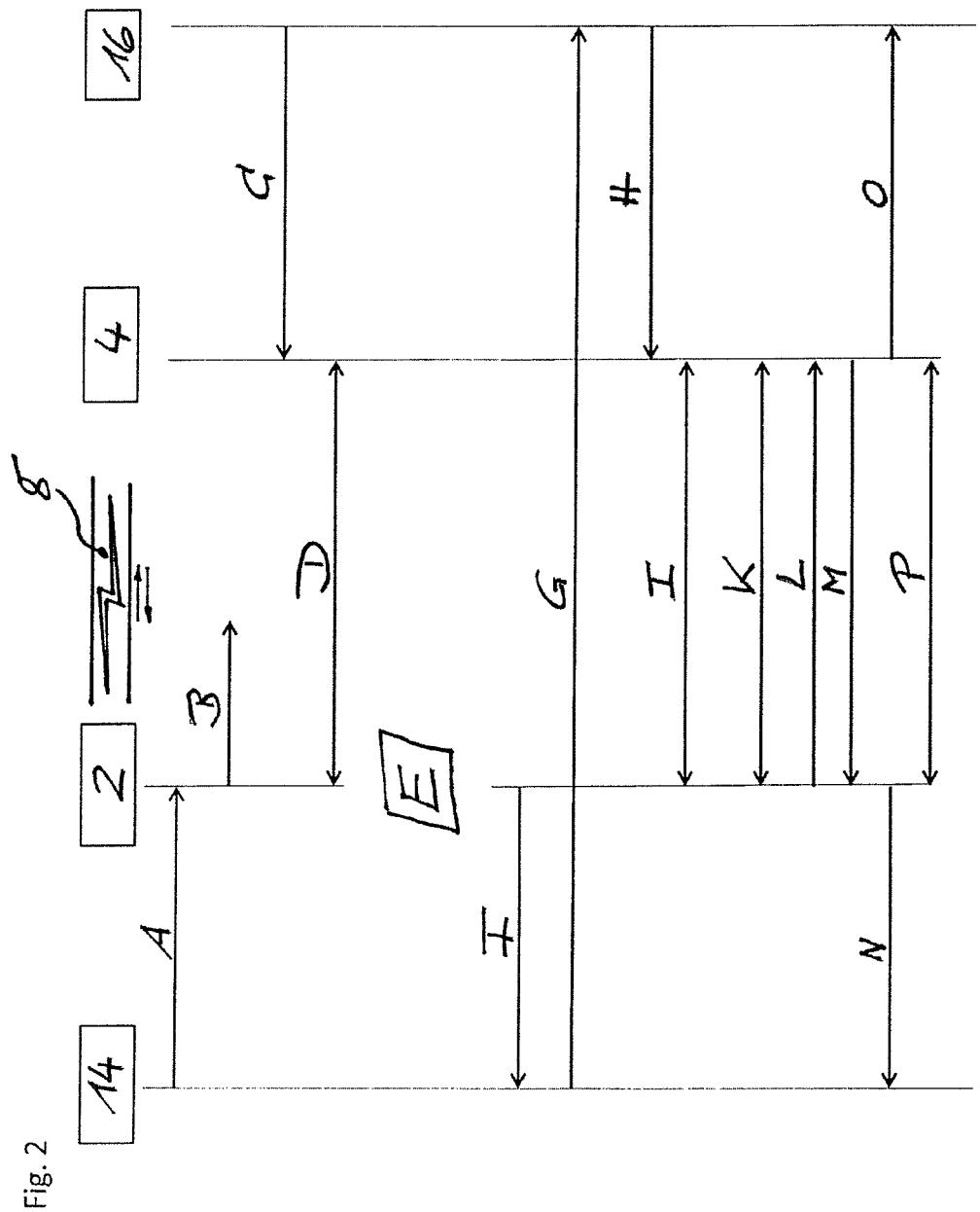
FIG. 2 is a representation of a method for a control data transmission between the vehicle data recording device and the test device.

FIG. 2 shows a method for transmitting control data via a short-distance radio link 8 between a vehicle data recording device 2 arranged in a motor vehicle and a test device 4 arranged outside the motor vehicle. The vehicle data recording device 2 is associated permanently with a device identification identifier. This is transmitted by radio (arrow B) to the test device 4 on request (arrow A) of a driver 14 of the motor vehicle. After confirmation (arrow C) by a test person 16, a connection (arrow D) is set up between the vehicle data recording device 2 and the test device 4.

Following this, a random code is generated via the vehicle data recording device 2 as a connection code comprising a connection identification identifier (block E), and the random code is indicated to the driver 14 by the vehicle data recording device 2 (arrow F). The random code indicated is detected, by the driver 14 in this exemplary embodiment, and forwarded to the test person 16, for example verbally (arrow G). Following this, the random code is input into the test device 4, by the test person 16 in the present exemplary embodiment (arrow H). Detection, forwarding and inputting of the random code can also be effected, however, automatically, for example by a transmission device.

After the random code has been input, coupling in the form of an authentication (arrow I), also called pairing, of vehicle data recording device 2 and test device 4 is automatically effected, and an encrypted radio link (arrow K) is set up between these devices. Following this, control data which, in particular, comprise driver data, is transmitted by the vehicle data recording device 2 to the test device 4 via the short-distance radio link (arrow L). After the successful transmission, a message (arrow M) about the successful transmission of the control data is produced by the test device 4 for the vehicle data recording device 2. This is indicated, furthermore, both to the driver 14 by the vehicle data recording device 2 (arrow N), and also to the test person 16 by the test device 4 (arrow O).

After conclusion of the control data transmission, the short-distance radio link between the vehicle data recording device 2 and the test device 4 is separated (arrow P) and the random code is deleted in the vehicle data recording device 2 and in the test device 4. The device identification identifier of the vehicle data recording device 2 is also deleted in the test device 4 after separation of the short-distance radio link.

In the exemplary embodiment according to FIG. 2, the random code only has one code component, namely the connection identification identifier.

Figure 3:
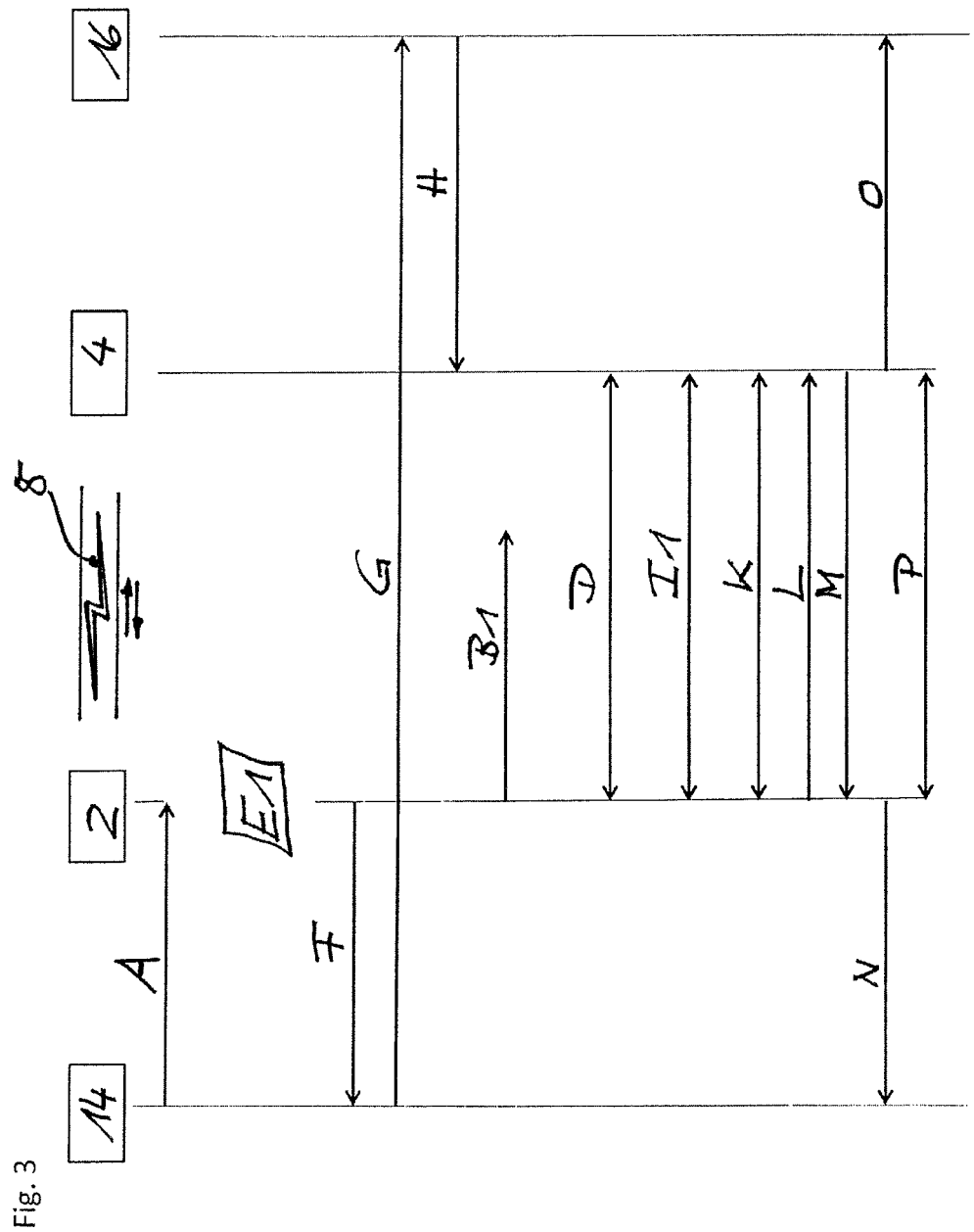
FIG. 3 is a representation of a variant of the method shown in FIG. 2.

In the exemplary embodiment according to FIG. 3, the random code exhibits two code components, one of the code components exhibiting a device identifier of the vehicle data recording device 2 and the other code component exhibiting the connection identification identifier. This random code is generated (block E1) and indicated (arrow F) via the vehicle data recording device 2 on request (arrow A) by the driver 14. Detection, forwarding and inputting of the random code take place as in the exemplary embodiment according to FIG. 2 and can be effected automatically, for example by a transmission device.

After the random code has been input into the test device 4, the short-distance radio link between vehicle data recording device 2 and test device 4 is switched on on the basis of the first code component (arrow B1), exhibiting the device identifier of the vehicle data recording device 2. After the connection has been set up (arrow D), an authentication is effected (arrow I1) on the basis of the second code component, exhibiting the connection identification identifier.

In the exemplary embodiments described above, the random code is generated as connection code, comprising the connection identification identifier, by the vehicle data recording device in each case; the vehicle data recording device is thus in each case the device generating the random code, the test device is in each case the device not generating the random code.

However, the methods described in the exemplary embodiments also operate correspondingly if conversely the random code is not generated by the vehicle data recording device but by the test device. The test device is then the device generating the random code and the vehicle data recording device is the device not generating the random code.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

I claim:

1. A method for transmitting control data between a vehicle data recording device arranged in a motor vehicle and a test device arranged outside the motor vehicle, comprising:
    generating a random code by one of the vehicle data recording device and the test device as a connection code comprising a connection identification identifier;
    providing the random code by the one of the vehicle data recording device and the test device generating the random code;
    detecting and inputting the random code into the other of the vehicle data recording device and the test device not generating the random code;
    automatically coupling the vehicle data recording device and the test device via a short-distance radio link after the random code has been input into the device not generating the random code;
    transmitting the control data by the vehicle data recording device to the test device via the short-distance radio link;
    separating the short-distance radio link between the vehicle data recording device and the test device after the control data transmission has ended; and
    deleting the random code in the vehicle data recording device and in the test device.

2. The method as claimed in claim 1, further comprising:
    permanently allocating a device identification identifier to the vehicle data recording device; and
    transmitting the device identification identifier to the test device for setting up the short-distance radio link before the random code is generated.

3. The method as claimed in claim 2, wherein after the short-distance radio link is separated, the device identification identifier is deleted in the test device.

4. The method as claimed in claim 1, wherein the random code comprises:
    a first code component comprising a device identifier of the device generating the random code; and
    a second code component comprising the connection identification identifier.

5. The method as claimed in claim 1, wherein the random code is provided at least one of optically and acoustically by the one of the vehicle data recording device and the test device generating the random code.

6. The method as claimed in claim 5, wherein the optical indication of the random code is effected by a printout of the random code by a printer.

7. The method as claimed in claim 1, wherein the random code is input at least one of manually and acoustically into the one of the vehicle data recording device and the test device not generating the random code.

8. The method as claimed in claim 1, wherein in the case of a non-error-free control data transmission, a new random code is generated before another control data transmission.

9. A system for transmitting control data comprising:
    a vehicle data recording device arranged in a motor vehicle; and
    a test device arranged outside the motor vehicle, wherein
    at least one of the vehicle data recording device and the test device has a random generator for generating a random code as a connection code, comprising a connection identification identifier, for a short-distance radio link between the vehicle data recording device and the test device,
    the one of the vehicle data recording device and the test device generating the random code has an output device configured to output the random code, and the other of the vehicle data recording device and the test device not generating the random code has an input device configured to input the random code.

10. The system as claimed in claim 9, wherein the output device has at least one of an optical display device, a loudspeaker, and a printer.

11. The system as claimed in claim 9, wherein the input device has at least one of a keyboard and a microphone.

\* \* \* \* \*